(12) United States Patent
Kawai et al.

(10) Patent No.: US 8,606,570 B2
(45) Date of Patent: Dec. 10, 2013

(54) IMAGING APPARATUS, METHOD OF CONTROLLING SAME AND COMPUTER PROGRAM THEREFOR

(75) Inventors: Tomoaki Kawai, Yokohama (JP); Yasuo Nakamura, Yokohama (JP); Shinji Shiraga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 12/489,917

(22) Filed: Jun. 23, 2009

(65) Prior Publication Data

US 2009/0326954 A1   Dec. 31, 2009

(30) Foreign Application Priority Data

Jun. 25, 2008   (JP) .................. 2008-166541

(51) Int. Cl.
*G10L 15/00*   (2006.01)
(52) U.S. Cl.
USPC ............ 704/233; 704/246; 348/143; 348/152
(58) Field of Classification Search
USPC .................... 348/143, 152; 704/233, 246
See application file for complete search history.

(56) References Cited

U.S. PATENT DOCUMENTS

| | | | | |
|---|---|---|---|---|
| 6,002,995 A | 12/1999 | Suzuki et al. | ................. | 702/188 |
| 6,297,856 B1 | 10/2001 | Nakamura et al. | ............ | 348/705 |
| 6,414,716 B1 | 7/2002 | Kawai | ............................ | 348/211 |
| 6,597,389 B2 | 7/2003 | Tanaka et al. | ............. | 348/14.08 |
| 7,038,699 B2 | 5/2006 | Sato et al. | ..................... | 345/633 |
| 7,174,299 B2 | 2/2007 | Fujii et al. | ..................... | 704/275 |
| 7,222,356 B1 | 5/2007 | Yonezawa et al. | ............ | 725/105 |
| 2002/0055845 A1 | 5/2002 | Ueda et al. | ..................... | 704/270 |
| 2004/0186726 A1* | 9/2004 | Grosvenor | ..................... | 704/275 |
| 2005/0007459 A1 | 1/2005 | Kawai et al. | ............. | 348/211.99 |
| 2006/0028556 A1* | 2/2006 | Bunn et al. | ............... | 348/211.99 |
| 2006/0219473 A1* | 10/2006 | Boland et al. | ................. | 181/139 |
| 2008/0211904 A1 | 9/2008 | Kato et al. | | |

FOREIGN PATENT DOCUMENTS

| | | |
|---|---|---|
| JP | 02-182093 A | 7/1990 |
| JP | 8-297792 | 11/1996 |
| JP | 11-341334 | 12/1999 |
| JP | 2002-116796 | 4/2002 |
| JP | 2002-182896 | 6/2002 |
| JP | 2004-110280 A | 4/2004 |
| JP | 2006-018818 A | 1/2006 |
| JP | 2008-015860 A | 1/2008 |

* cited by examiner

*Primary Examiner* — Daniel Abebe
(74) *Attorney, Agent, or Firm* — Fitzpatrick, Cella, Harper & Scinto

(57) ABSTRACT

An imaging apparatus is provided. The apparatus includes a sound collecting unit configured to collect speech in a monitored environment, a shooting unit configured to shoot video in the monitored environment, a detection unit configured to detect a change in a state of the monitored environment based upon a change in data acquired by the sound collecting unit, the shooting unit and a sensor for measuring the state of the monitored environment, a recognition unit configured to recognize the change in state with regard to speech data acquired by the sound collecting unit and video data acquired by the shooting unit, and a control unit configured to start up the recognition unit and select a recognition database, which is used by the recognition unit, based upon result of detection by the detection unit.

16 Claims, 7 Drawing Sheets

IMAGING APPARATUS, METHOD OF CONTROLLING SAME AND COMPUTER PROGRAM THEREFOR

BACKGROUND OF THE INVENTION

1. Field of the Invention

The present invention relates to a shooting technique and, more particularly, to a shooting technique for monitoring.

2. Description of the Related Art

Latent demand for viewing the situation at remote areas, particularly in view of public safety, and new ways to use cameras are being studied from various standpoints inclusive of the technical aspects.

For example, against a background of more widespread use and higher speeds of network environments typified by the Internet, so-called network cameras that make it possible to view video from a remote location are becoming increasingly popular. In addition, the processing capability of speech and image is being improved and technologies relating to advanced speech detection and speech recognition, advanced video detection and video recognition are being studied. In view of the foregoing, various techniques for performing recognition and detection using speech and video.

There are examples of techniques utilizing recognition and detection. For example, the specification of Japanese Patent Laid-Open No. 8-297792 proposes a technique for sensing a change in state using an amount of motion or sound above a threshold value. The specification of Japanese Patent Laid-Open No. 11-341334 proposes a technique for inferring a speaker from the result of recognition of input speech and taking a close-up of the speaker in accordance with shooting conditions set beforehand in conformity with the speaker.

On the other hand, there are examples of techniques that utilize a plurality of recognition apparatuses. For example, the specification of Japanese Patent Laid-Open No. 2002-116796 proposes a technique for sending input speech to all recognition apparatuses using a plurality of speech recognition apparatuses connected to a network and adopting the result from the speech recognition apparatus whose recognition result has the highest score. The specification of Japanese Patent Laid-Open No. 2002-182896 proposes a technique directed to a case where a plurality of speech recognition engines exist having speech recognition apparatuses for a small vocabulary locally and a large vocabulary remotely, wherein the speech recognition engine used is decided in response to the user clearly designating which engine should be utilized.

However, in case of utilization for monitoring or the like, the apparatus often is operated in an unmanned situation. Although it is true that sensing and recognition performance has been improved, there are not a few cases where these sensing and recognition functions are still not adequate, in terms of processing load and accuracy, to satisfy the requirement for use in unmanned situations.

SUMMARY OF THE INVENTION

According to one aspect of the present invention, an imaging apparatus comprises: a sound collecting unit configured to collect speech in a monitored environment; a shooting unit configured to shoot video in the monitored environment; a detection unit configured to detect a change in a state of the monitored environment based upon a change in data acquired by sound collecting unit, the shooting unit and a sensor for measuring the state of the monitored environment; a recognition unit configured to recognize the change in state with regard to speech data acquired by the sound collecting unit and video data acquired by the shooting unit; and a control unit configured to start up the recognition unit and select a recognition database, which is used by the recognition unit, based upon result of detection by the detection unit.

According to another aspect of the present invention, an imaging apparatus comprises: a sound collecting unit configured to collect speech in a monitored environment; a shooting unit configured to shoot video in the monitored environment; a detection unit configured to detect a change in a state of the monitored environment based upon a change in data acquired by the sound collecting unit, the shooting unit and a sensor for measuring the state of the monitored environment; a communication unit configured to transmit data and detection content, acquired by the sound collecting unit and the shooting unit over a period of time during which the detection unit detected the change in state of the monitored environment, to a recognition apparatus for recognizing the change in state, and to receive result of recognition with respect to content transmitted; and a control unit configured to cause the communication unit to transmit to the recognition apparatus based upon result of detection by the detection unit, and to adjust parameters, which are used in detecting the change in state of the monitored environment, based upon the result of recognition.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings.

<First Embodiment>

Figure 1:
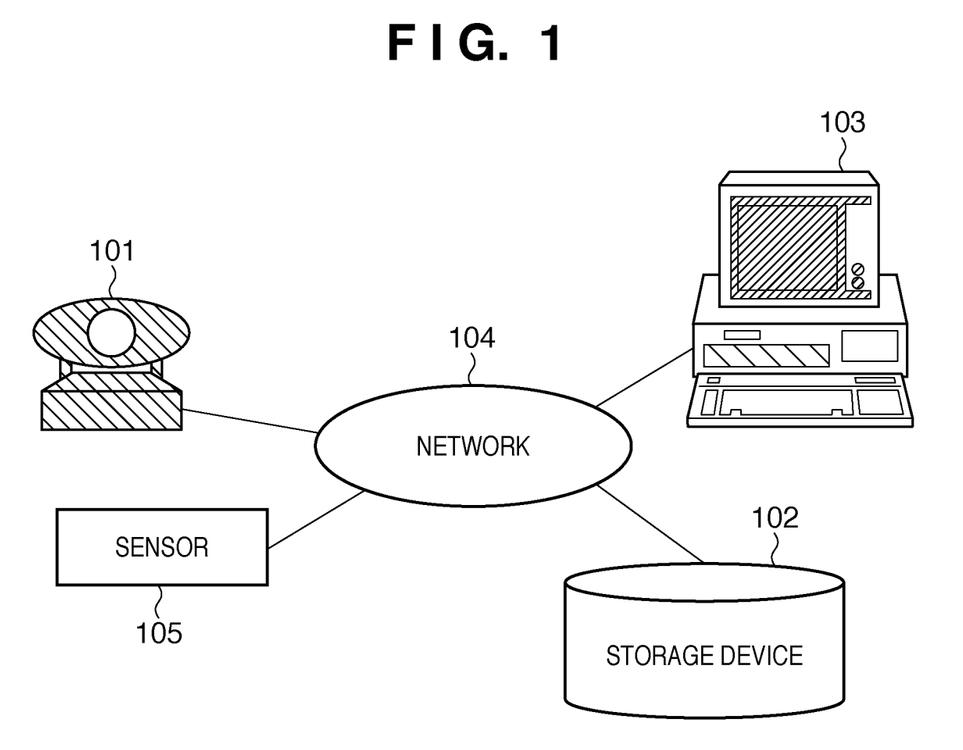
FIG. 1 is an exemplary diagram illustrating the configuration of a system according to first and second embodiments of the present invention.

FIG. 1 is an exemplary diagram illustrating the configuration of a system according to a first embodiment of the present invention. In the illustrated system, an imaging apparatus 101, a storage device 102, a sensor 105 and an operating terminal 103 are connected via a network 104. The imaging apparatus 101 shoots video and collects speech in a monitored environment. When necessary, the storage device 102 stores video and speech transmitted from the imaging apparatus 101. The operating terminal 103 is for viewing video and listening to speech transmitted from the imaging apparatus 101 and is used to operate the imaging apparatus 101. The operating terminal 103 also receives notification of abnormality detection if a change in state has been detected by the imaging apparatus 101. It should be noted that information relating to a change in state detected or recognized by the imaging apparatus 101 also is stored together with the video and speech in the storage device 102. The sensor 105 is, for example, a window-glass sensor or door sensor, measures the state of the monitored environment and outputs the acquired results of measurement to the imaging apparatus 101. The network 104 is, for example, a LAN or WAN but may be any network, such as a dedicated communication network, so long as a satisfactory link can be assured in order to communicate video and speech. Further, it does not matter if a plurality of imaging apparatuses 101, storage devices 102, sensors 105 and operating terminals 103 are connected to the network 104. In this case, communication would be achieved upon specifying the other party to communication.

Further, although the imaging apparatus 101 transmits a detected change in state to the operating terminal 103 and storage device 102, the detected change in state may just as well be retained within the imaging apparatus 101. In this case, the data retained within the imaging apparatus 101 would be acquired by an administrator periodically via the network or directly.

Figure 2:
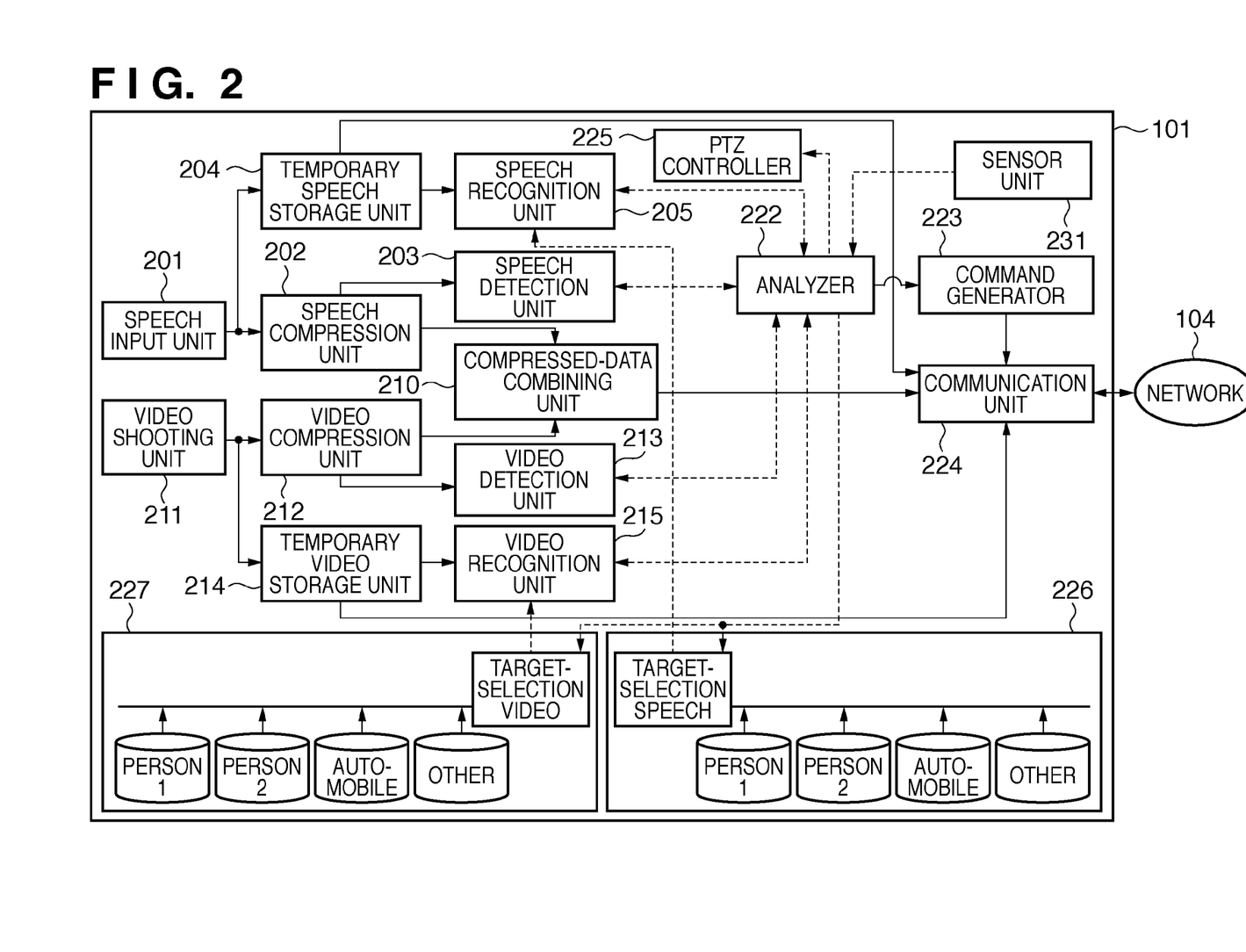
FIG. 2 is an exemplary functional block diagram of an imaging apparatus 101 according to an embodiment.

FIG. 2 is an exemplary functional block diagram of the imaging apparatus 101 according to this embodiment. Here a speech input unit 201 applies an A/D conversion to a speech signal that has been input from a microphone or the like. A speech compression unit 202 compresses the speech signal that has undergone the A/D conversion. A video shooting unit 211 applies an A/D conversion to a video signal that has been input from an image sensor. A video compression unit 212 compresses the video signal that has undergone the A/D conversion. A compressed-data combining unit 210 combines the compressed video data and the compressed speech data. A communication unit 224 converts the combined data to a form in which it can be transmitted to the network 104 and then transmits the data to the storage device 102 and operating terminal 103. Upon receiving the combined data, the storage device 102 and operating terminal 103 store and display the data, respectively. Examples of speech compression schemes that can be employed by the speech compression unit 202 are G.711, G.722 and G.723, etc. Examples of video compression schemes that can be employed by the video compression unit 212 are Motion-JPEG, MPEG-2 and H.264, etc. These are merely illustrative examples and the present invention can be applied using other compression schemes as well.

A speech detection unit 203 uses collected speech to detect the occurrence of a change in state of sound or speech based upon previously set conditions. The speech detection unit 203 performs speech detection in the course of compression by the speech compression unit 202 or by using compressed speech data. For example, the speech detection unit 203 detects a change in the state of speech according to the following conditions:

the magnitude of speech attains a level greater than a previously set level; and the sum total of levels of a specific frequency component in speech within a fixed period of time attains a level greater than a previously set level.

It is important that speech detection in the course of speech compression or speech detection using compressed speech data be achievable with higher precision in the speech detection unit 203. The speech detection unit 203 notifies an analyzer 222 of the detected change in the state of speech.

Using shot video, a video detection unit 213 detects a change in the state of video based upon previously set conditions such as whether a suspicious person has trespassed, behaved abnormally, loitered or made off with something. The video detection unit 213 performs video detection in the course of compression by the video compression unit 212 or by using compressed video data. For example, the video detection unit 213 detects a change in the state of speech according to the following conditions:

a DCT (Direct Cosine Transform) coefficient of a specific DCT component attains a value greater than a previously set value;

a difference between frames of DCT coefficients is taken for every DCT component and a sum of differences computed within a fixed period of time attains a value greater than a fixed amount; and a sum of absolute values of motion vector components attains a value greater than a specific size.

It is important that video detection in the course of video compression or video detection using compressed video data be achievable with higher precision in the video detection unit 213. The video detection unit 213 notifies the analyzer 222 of the detected change in the state of video.

A temporary speech storage unit 204 temporarily buffers uncompressed digital speech data that is the output from the speech input unit 201. The buffering is performed by a FIFO (first-in, first-out) buffer so that the latest speech data over a fixed period of time (e.g., 10 seconds) is always retained. Basically, the temporary speech storage unit 204 always stores speech before and after a point in time that is the target of speech detection.

A temporary video storage unit 214 temporarily buffers uncompressed digital video data that is the output from the video shooting unit 211. The buffering is performed by a FIFO (first-in, first-out) buffer so that the latest video data over a fixed period of time (e.g., 10 seconds) is always retained. Basically, the temporary video storage unit 214 always stores video before and after a point in time that is the target of video detection.

A speech recognition unit 205 performs speech recognition based upon uncompressed speech data being retained in the temporary speech storage unit 204. For example, the speech recognition unit 205 performs recognition that cannot be carried out by the speech detection unit 203, such as whether collected sound is the voice of an adult or child, the voice of a male or female, the sound of a door opening and closing, the sound of glass breaking or the sound of an automobile engine. Further, the speech recognition unit 205 may perform advanced recognition such as advanced person identification or behavior identification based upon speech. In this case, the speech recognition unit 205 changes over a speech recognition algorithm used and a speech recognition database 226 depending upon what is recognized, such as a person or vehicle. In any case, if it recognizes a speech pattern that matches a previously set recognition target, then the speech recognition unit 205 regards this as recognition of speech. It should be noted that a plurality of speech targets may be set in advance and that the recognition target may be a certain fixed range. For example, the speech recognition unit 205 may determine that an abnormality has been recognized in a case where specific words are recognized in a male's voice or in a case where simply a child's crying voice is recognized. The speech recognition unit 205 notifies the analyzer 222 of the result of speech recognition. Various databases suited to recognition are prepared in the speech recognition database 226. For example, data for recognizing a specific person or data for recognizing an automobile is prepared.

A video recognition unit 215 performs video recognition based upon uncompressed video data being retained in the temporary video storage unit 214. For example, the video recognition unit 215 performs recognition that cannot be carried out by the video detection unit 213, such as whether video is that of a specific operation by a person, that of the face of a person, that of a specific animal such as a cat or dog, or that of an object such as an automobile. Further, the video recognition unit 215 may perform advanced recognition such as advanced person identification based upon video or automobile model identification based upon engine sound. In case of identification of a person, the video recognition unit 215 performs a discrimination operation as to who a face belongs to or whether a person is an unknown person or not. In this case, the video recognition unit 215 changes over a video recognition algorithm and a video recognition database 227 depending upon the field of recognition, such as a person or vehicle. In any case, if it recognizes a video pattern that matches a previously set recognition target, then the video recognition unit 215 regards this as recognition of an abnormality. It should be noted that a plurality of speech targets may be set in advance and that the recognition target may be a certain fixed range. For example, the video recognition unit 215 may determine that an abnormality has been recognized in a case where the face of a specific person or of an unknown person is recognized or in a case where a person is simply recognized. The video recognition unit 215 notifies the analyzer 222 of the result of recognition. Various databases suited to recognition are prepared in the video recognition database 227. For example, data for recognizing a specific person or data for recognizing an automobile is prepared.

A sensor unit 231 receives a trigger from a sensor such as a presence sensor or door sensor and so notifies the analyzer 222 along with the time at which the trigger occurred.

The analyzer 222 executes suitable detection and recognition in accordance with results of processing executed by the sensor unit 231, speech detection unit 203, speech recognition unit 205, video detection unit 213 and video recognition unit 215. The details will be described later. There are instances below in which the speech detection unit 203, speech recognition unit 205, video detection unit 213 and video recognition unit 215 are expressed collectively as detection/recognition units.

The analyzer 222 further delivers information such as the results of detection/recognition and time information to a command generator 223 in order to generate a command having a suitable form representing the results of detection by the detection/recognition units. The command generator 223 generates a notification command from these items of information and transmits the command to the storage device 102 and operating terminal 103 via the communication unit 224. The notification command is a command for giving notification of detection and includes information such as the time of detection and the object recognized.

A PTZ controller 225 controls the PTZ of the imaging apparatus 101. Here "PTZ" stands for the pan and tilt angles and zoom magnification of the imaging apparatus 101. The recognizability of a specific target can be enhanced by setting the PTZ suitably.

Figure 3:
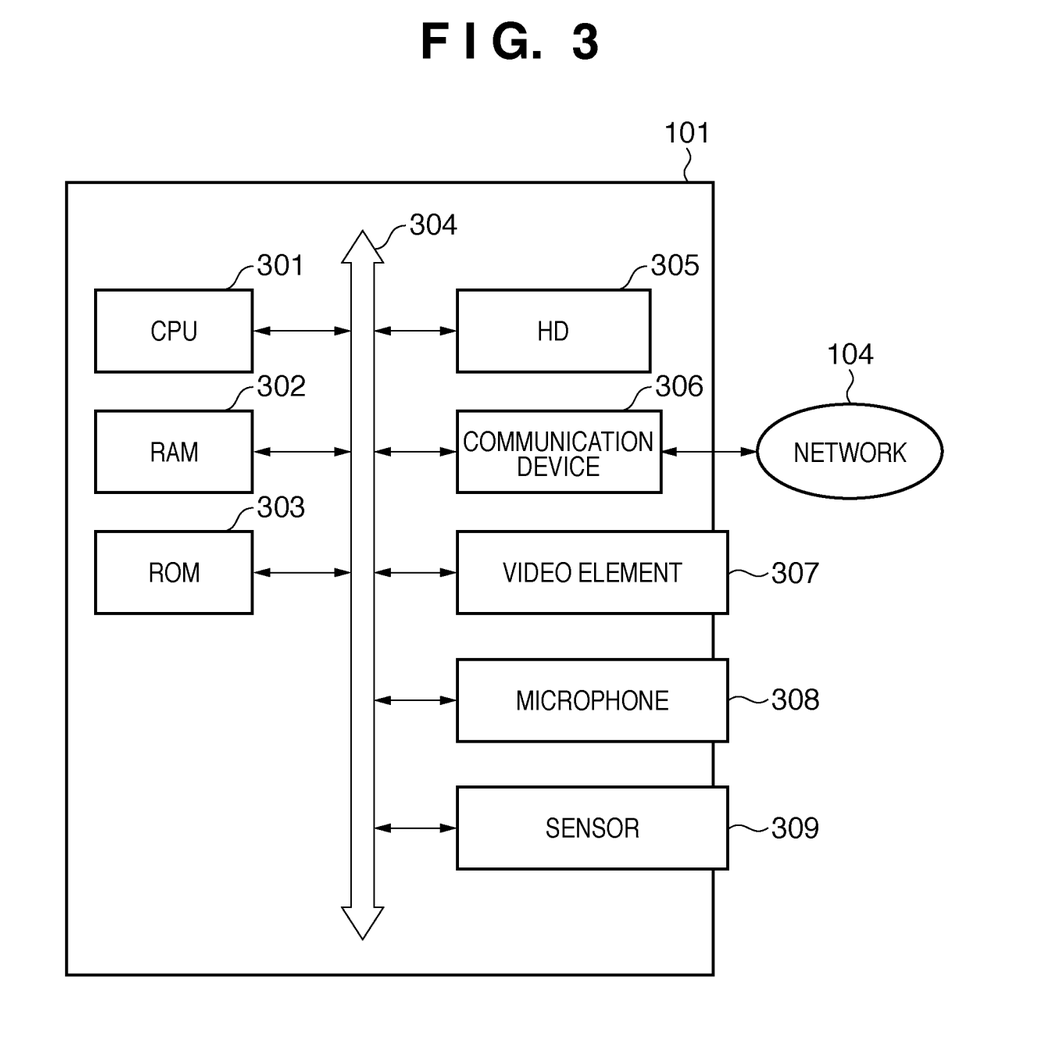
FIG. 3 is an exemplary diagram illustrating the hardware configuration of the imaging apparatus 101 according to an embodiment.

FIG. 3 is an exemplary diagram illustrating the hardware configuration of the imaging apparatus 101 according to this embodiment. A CPU 301 serving as a microprocessor controls the imaging apparatus 101 based upon programs and data that have been stored in a ROM 303 and on a hard disk (HD) 305.

A RAM 302 functions as a work area of the CPU 301 and reads out a program that has been stored in the ROM 303 or on the hard disk 305.

The ROM 303 and hard disk 305 store a program, such as the program described later, executed by the CPU 301. Further, the ROM 303 and hard disk 305 also store the speech recognition database 226 and video recognition database 227 shown in FIG. 2.

A communication device 306 functions as the communication unit 224 shown in FIG. 2 and is connected to the network 104. A video element 307 functions as the video shooting unit 211 shown in FIG. 2 and shoots video in the vicinity of the imaging apparatus 101. A microphone 308 functions as the speech input unit 201 shown in FIG. 2 and collects speech in the vicinity of the imaging apparatus 101. A sensor 309 is a presence sensor or door sensor, senses a change in the vicinity of the imaging apparatus 101 and outputs a trigger to the sensor unit 231 shown in FIG. 2. If the sensor 309 is capable of outputting the trigger to the imaging apparatus 101, it may just as well be placed outside the imaging apparatus 101. The elements described above are connected via a bus 304.

Processing executed by the imaging apparatus 101 will be described with reference to the flowcharts of FIGS. 4 to 9. The CPU 301 executes a program that has been read out to the RAM 302, whereby the processing indicated by these flowcharts is executed.

Figure 4:
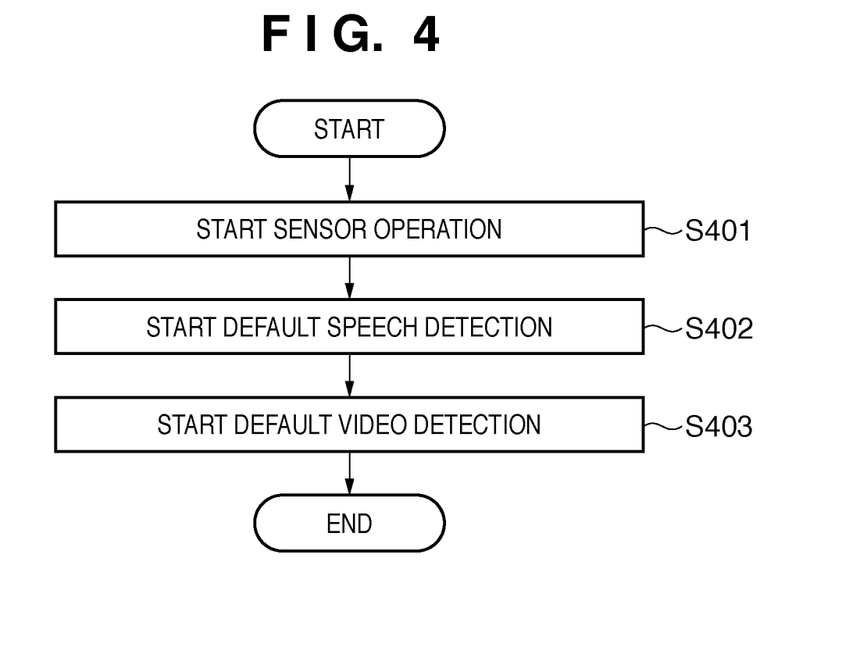
FIG. 4 is a flowchart for describing an exemplary initial operation of the imaging apparatus 101 in an embodiment.

FIG. 4 is a flowchart for describing an exemplary initial operation of the imaging apparatus 101 in an embodiment.

In step S401, the analyzer 222 instructs the sensor unit 231 to start operating. Upon being so instructed, the sensor unit 231 starts measurement using the sensor 309.

In step S402, the analyzer 222 instructs the speech detection unit 203 to start operating. Upon being so instructed, the speech detection unit 203 starts detection using default settings that enable broad detection. For example, the speech detection unit 203 detects only the fact that volume has exceeded a fixed volume. At the stage of initial operation, the speech recognition unit 205 does not yet operate.

In step S403, the analyzer 222 instructs the video detection unit 213 to start operating. Upon being so instructed, the video detection unit 213 starts detection using default settings that enable broad detection. For example, the video detection unit 213 detects only the fact that motion has attained a fixed amount of motion. At the stage of initial operation, the video recognition unit 215 does not yet operate.

It should be noted that steps S401 to S403 may be executed in any order or may just as well be executed concurrently.

Figure 5:
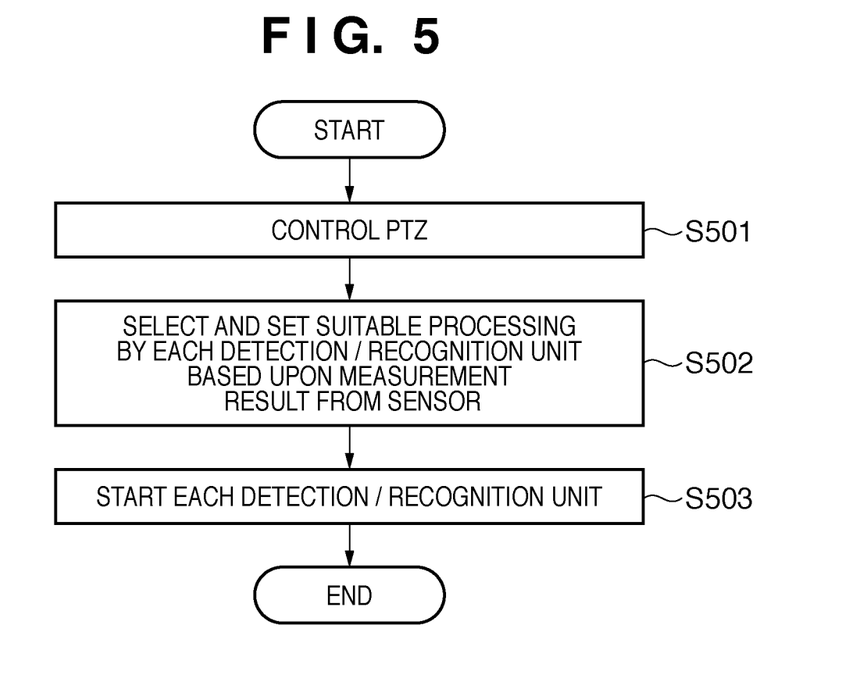
FIG. 5 is a flowchart for describing an exemplary processing by the imaging apparatus 101 in a case where an event has been sensed by a sensing unit in an embodiment.

FIG. 5 is a flowchart for describing an exemplary processing by the imaging apparatus 101 in a case where an event has been sensed by the sensing unit in this embodiment.

In step S501, the analyzer 222 controls the PTZ controller 225 based upon events which are the result of detection and changes the PTZ settings. For example, in a case where a window-glass sensor, which is one type of sensor 309, has sensed an event, the analyzer 222 makes the PTZ settings so as to emphasize window glass. Further, the analyzer 222 may adjust the direction and sensitivity of the microphone 308 in conformity with the PTZ settings.

In step S502, the analyzer 222 changes the settings of the detection/recognition units based upon the sensed events. Appropriate settings of speech detection parameters, video detection parameters, the speech recognition database 226, and video recognition database 227, which conform to the combination of events sensed by the sensor 309, are defined in the analyzer 222 beforehand. Optimum speech detection, video detection, speech recognition and video recognition are executed in line with these settings.

For example, if the window-glass sensor has sensed an event, there is a high likelihood that a window has been broken and that a suspicious person will intrude. Accordingly, the detection/recognition units are set optimally so that detection and recognition of video and speech premised upon a suspicious person can be performed. Further, if a door sensor has sensed an event and an ID card recognition sensor has recognized a normal ID card, then there is a high likelihood that a person already known will appear. Accordingly, a database of already known persons is used as the video and speech recognition databases. Further, if a weight sensor has sensed a weight in excess of a fixed threshold value, there is a high likelihood that an automobile has entered a garage. Accordingly, the imaging apparatus is pointed in this direction and the detection/recognition units are set optimally so that speech detection and recognition can detect and recognize the sound of an engine and video detection and recognition can detect the automobile.

In step S503, the detection/recognition units start processing based upon the set content of processing.

Figure 6:
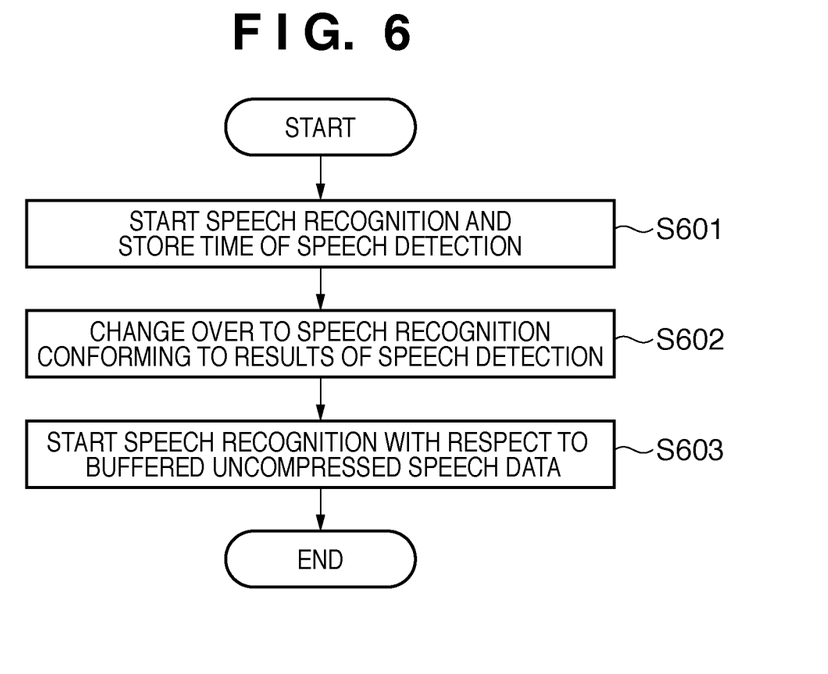
FIG. 6 is a flowchart for describing an exemplary processing by the imaging apparatus 101 in a case where a speech detection unit 203 has detected an abnormality in an embodiment.

FIG. 6 is a flowchart for describing an exemplary processing by the imaging apparatus 101 in a case where the speech detection unit 203 has detected a change in state.

In step S601, the analyzer 222 instructs the speech recognition unit 205 to start operating. In addition, the analyzer 222 stores the time at which the change in state was detected.

In step S602, the analyzer 222 selects the speech detection parameters and speech recognition database 226 based upon the results of detection. For example, if a detected sound is a human voice, the analyzer 222 selects the nearest speech recognition parameters and the speech recognition database 226.

In step S603, the speech recognition unit 205 applies recognition processing to uncompressed data that is being retained in the temporary speech storage unit 204. Accordingly, the speech recognition unit 205 starts recognition from a time slightly earlier than the moment at which speech was detected.

Figure 7:
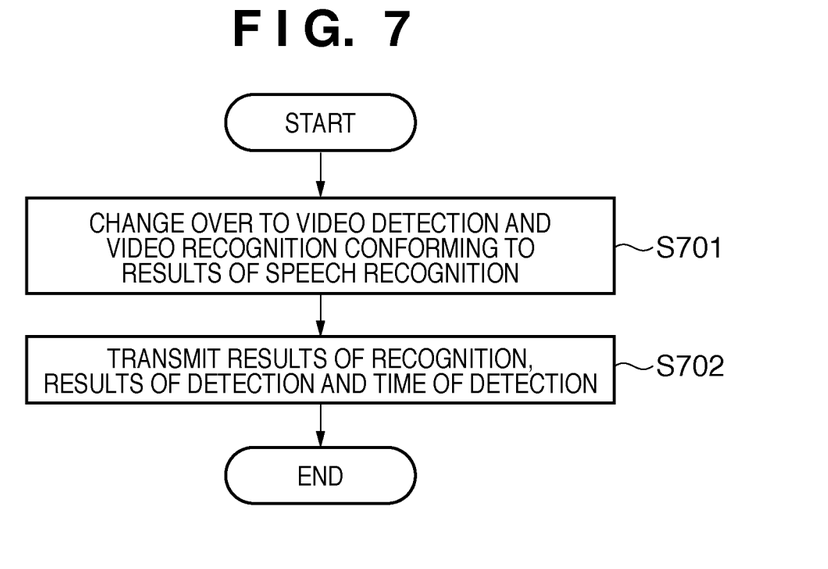
FIG. 7 is a flowchart for describing an exemplary processing by the imaging apparatus 101 in a case where a speech recognition unit 205 has detected speech in an embodiment.

FIG. 7 is a flowchart for describing an exemplary processing by the imaging apparatus 101 in a case where the speech recognition unit 205 has detected speech.

In step S701, the analyzer 222 selects the video recognition parameters and the video recognition database 227 in accordance with the result of speech recognition by the speech recognition unit 205. For example, if a specific person could be recognized, then the analyzer 222 makes a selection in such a manner that video detection and video recognition conforming to this person can be carried out.

In step S702, the analyzer 222 transmits the results of recognition by the speech recognition unit 205 to the storage device 102 and operating terminal 103 together with the uncompressed data of the recognition target and the time of occurrence.

Figure 8:
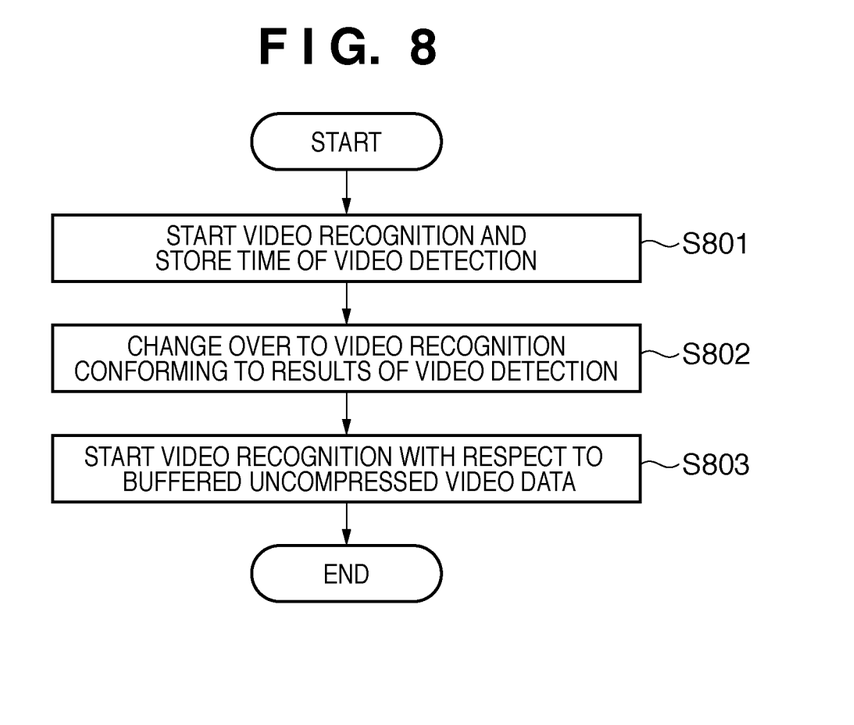
FIG. 8 is a flowchart for describing an exemplary processing by the imaging apparatus 101 in a case where a video detection unit 213 has detected an abnormality in an embodiment.

FIG. 8 is a flowchart for describing an exemplary processing by the imaging apparatus 101 in a case where the video detection unit 213 has detected a change in state.

In step S801, the analyzer 222 instructs the video recognition unit 215 to start operating. In addition, the analyzer 222 stores the time at which the change in state was detected.

In step S802, the analyzer 222 selects the video detection parameters and video recognition database 227 based upon the results of detection. For example, if detected video indicates the figure of a person, the analyzer 222 selects the nearest video recognition parameters and the video recognition database 227.

In step S803, the video recognition unit 215 applies recognition processing to uncompressed data that is being retained in the temporary video storage unit 214. Accordingly, the video recognition unit 215 starts recognition from a time slightly earlier than the moment at which video was detected.

Figure 9:
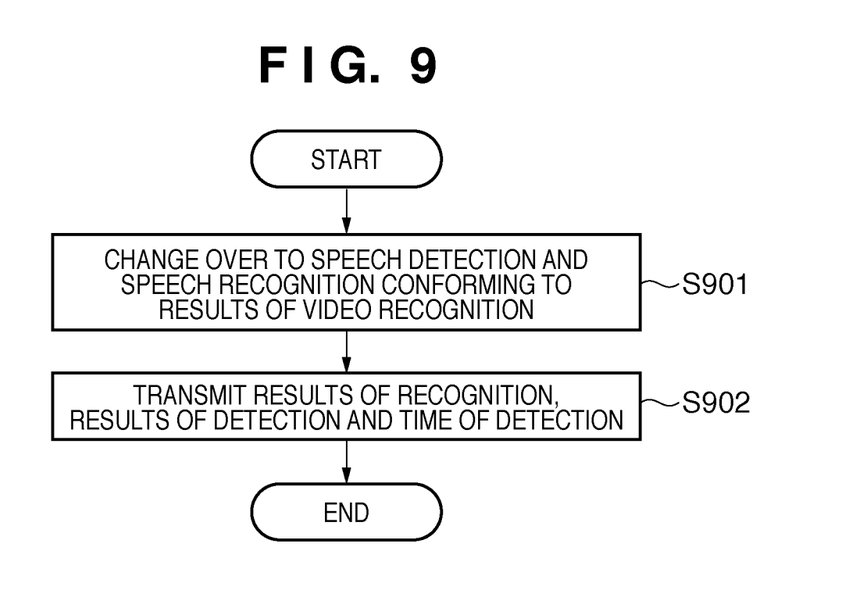
FIG. 9 is a flowchart for describing an exemplary processing by the imaging apparatus 101 in a case where a video recognition unit 215 has recognized video in an embodiment.

FIG. 9 is a flowchart for describing an exemplary of processing by the imaging apparatus 101 in a case where the video recognition unit 215 has detected video.

In step S901, the analyzer 222 selects the speech recognition parameters and the speech recognition database 226 in accordance with the result of video recognition by the video recognition unit 215. For example, if a specific person could be recognized, then the analyzer 222 makes a selection in such a manner that speech detection and speech recognition conforming to this person can be carried out.

In step S902, the analyzer 222 transmits the results of video recognition to the storage device 102 and operating terminal 103 together with the uncompressed data of the recognition target and the time of occurrence.

With regard to sensor sensing, speech detection, speech recognition, video detection and video recognition described in conjunction with FIGS. 5 to 9, it is assumed that processing is executed irrespective of whether or not distribution of data to the storage device 102 and operating terminal 103 is in progress.

Thus, by changing over sensor sensing, speech detection, speech recognition, video detection and video recognition to optimum processing in accordance with results of processing thus far, detection and recognition accuracy can be improved. Further, speech recognition and video recognition that generally involve a heavy processing load is activated as necessary rather than at all times, thereby making it possible to alleviate the processing load within the imaging apparatus.

<Second Embodiment>

In the first embodiment, the speech recognition unit 205 and video recognition unit 215 are started up immediately after an abnormality is detected by each of the detection units. However, if the temporary video storage unit 214 and temporary speech storage unit 204 have sufficient storage capacity, then video and speech recognition after detection of abnormality in video and speech need not necessarily be executed in real-time along the time axis but may just as well be processed asynchronously over a period of time.

This embodiment is such that if an abnormality is detected, uncompressed video and speech data in the temporary video storage unit 214 and temporary speech storage unit 204 before and after detection is made partially undeletable. Recognition is then performed while the imaging apparatus 101 is under a light load. Processing in this case need not be real-time processing (streaming processing). By adopting this expedient, it is possible to construct the recognition unit at lower cost.

<Third Embodiment>

Figure 10:
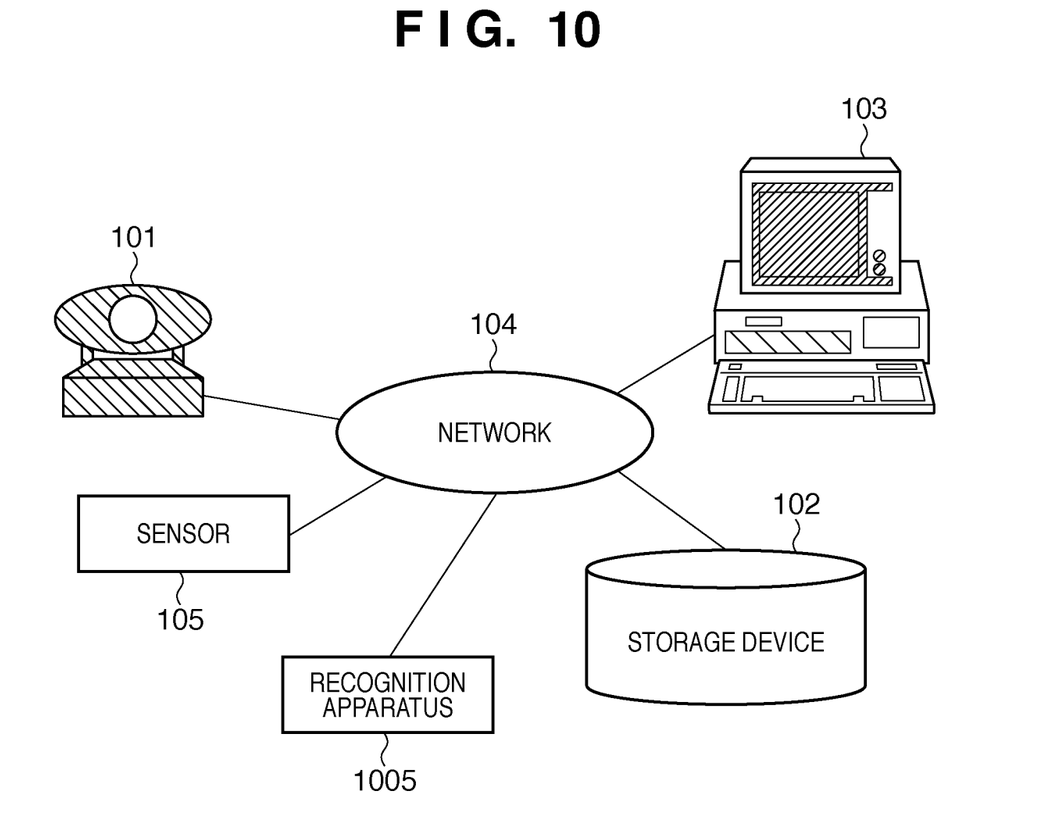
FIG. 10 is an exemplary diagram illustrating a system configuration in a case where a recognition unit in a third embodiment is made a separate apparatus.

In the first embodiment, the recognition unit is provided within the imaging apparatus 101. Such processing executed in the recognition unit as person identification and the ascertainment and analysis of the content of a conversation generally involves a heavy processing load. Accordingly, as illustrated in FIG. 10, the processing load on the imaging apparatus 101 may be alleviated by providing the recognition unit outside the imaging apparatus 101. FIG. 10 is an exemplary diagram illustrating a system configuration in a case where a recognition unit is made an apparatus separate from the imaging apparatus 101. Specifically, a recognition apparatus 1005 and the imaging apparatus 101 are connected via the network 104.

The operation of the imaging apparatus 101 in this embodiment is basically similar to that described in the first embodiment. That is, video and speech data accepted from the video shooting unit 211 and speech input unit 201 shown in FIG. 2 is compressed by the video compression unit 212 and speech compression unit 202 and combined in the compressed-data combining unit 210. The combined data, which is content that has been detected, is transmitted from the communication unit 224 to the storage device 102 and operating terminal 103 as an ordinary stream of compressed video and speech.

Furthermore, this embodiment is such that at the time of video detection and at the time of speech detection, the uncompressed video and speech data that has been stored in the temporary speech storage unit 204 and temporary video storage unit 214 is transmitted by the analyzer 222 to the recognition apparatus 1005 as data separate from the ordinary stream of compressed video and speech.

The imaging apparatus 101 receives the result of recognition, which is the response from the external recognition unit, by the communication unit 224, and the analyzer 222 changes the operation of the detection unit, as by adjusting parameters, based upon the result of recognition.

In general, much of recognition such as person recognition and ascertainment of content of a conversation relies upon uncompressed data and not compressed data. In this embodiment, therefore, uncompressed video and speech data is transmitted to the recognition apparatus 1005. This means that when recognition is performed, it is unnecessary to decode compressed video and speech data. Generally, as long as compression is not lossless compression, some video and speech data is lost owing to compression. Accordingly, if data once compressed is then expanded and subjected to recognition, it is possible that data loss due to compression will have an adverse effect upon recognition. However, this adverse effect can be eliminated by transmitted uncompressed data to the separate apparatus and having this apparatus execute recognition. It should be noted that the recognition apparatus 1005 can be integrated with the operating terminal 103 or storage device 102.

If data loss due to compression will have no adverse effect upon recognition, then video and speech may just as well be compressed and transmitted so that the communication band may be used efficiently. The compression method in such case would involve a transmission method different from that of a compressed stream used in video and speech distribution performed by an ordinary imaging apparatus.

<Other Embodiment>

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166541, filed Jun. 25, 2008, which is hereby incorporated by reference herein in its entirety.

What is claimed is:

1. An imaging apparatus comprising:
   a sound collecting unit configured to collect speech in a monitored environment;
   a shooting unit configured to shoot video in the monitored environment;
   a detection unit configured to detect a change in a state of the monitored environment based upon a change in data acquired by said sound collecting unit, said shooting unit and a sensor for measuring the state of the monitored environment;
   a recognition unit configured to recognize the state with regard to speech data acquired by said sound collecting unit and video data acquired by said shooting unit; and
   a control unit configured to start up said recognition unit and select a recognition database, which is used by said recognition unit, based upon result of detection by said detection unit.

2. The apparatus according to claim 1, wherein said control unit adjusts parameters used by said detection unit in detecting the change in state of the monitored environment, based upon the result of detection by said detection unit or the result of recognition by said recognition unit.

3. The apparatus according to claim 1, further comprising a storage unit configured to store the video data and speech data for a period of time during which said detection unit detected the change in state of the monitored environment;

wherein said recognition unit performs recognition asynchronously with respect to detection of the change in state by said detection unit, using the data that has been stored in said storage unit.

4. The apparatus according to claim 1, wherein said detection unit detects the change in state of the monitored environment based upon a change in DCT coefficients or motion vector included in the video data acquired by said shooting unit.

5. The apparatus according to claim 1, further comprising a communication unit configured to transmit the result of detection by said detection unit and the result of recognition by said recognition unit.

6. A computer program stored on a storage medium for causing a computer to function as the imaging apparatus set forth in claim 1.

7. An imaging apparatus comprising:
a sound collecting unit configured to collect speech in a monitored environment;
a shooting unit configured to shoot video in the monitored environment;
a detection unit configured to detect a change in a state of the monitored environment based upon a change in data acquired by said sound collecting unit, said shooting unit and a sensor for measuring the state of the monitored environment;
a communication unit configured to transmit data and detection content, acquired by said sound collecting unit and said shooting unit over a period of time during which said detection unit detected the change in state of the monitored environment, to a recognition apparatus for recognizing the state, and to receive result of recognition with respect to content transmitted; and
a control unit configured to cause said communication unit to transmit to the recognition apparatus based upon result of detection by said detection unit, and to adjust parameters, which are used in detecting the change in state of the monitored environment, based upon the result of recognition.

8. A computer program stored on a storage medium for causing a computer to function as the imaging apparatus set forth in claim 7.

9. A method of controlling an imaging apparatus having a sound collecting unit for collecting speech in a monitored environment, and an shooting unit for shooting video in the monitored environment, said method comprising:
detecting a change in a state of the monitored environment based upon a change in data acquired by the sound collecting unit, the shooting unit and a sensor for measuring the state of the monitored environment;
selecting a recognition database, which is used in recognition, and starting up recognition based upon result of detection at said detecting; and
recognizing, in response to start-up of recognition, the state, using the selected recognition database, with regard to speech data acquired by the sound collecting unit and video data acquired by the shooting unit.

10. A method of controlling an imaging apparatus having a sound collecting unit for collecting speech in a monitored environment, and an shooting unit for shooting video in the monitored environment, said method comprising:
detecting a change in a state of the monitored environment based upon a change in data acquired by the sound collecting unit, the shooting unit and a sensor for measuring the state of the monitored environment;
transmitting data and detection content, acquired by the sound collecting unit and the shooting unit over a period of time during which the change in state of the monitored environment was detected at said detecting, to a recognition apparatus for recognizing the state based upon the result of detection at said detecting;
receiving result of recognition with respect to content transmitted; and
adjusting parameters, which are used in detecting the change in state of the monitored environment, based upon the result of recognition.

11. An information processing apparatus comprising:
a monitoring unit configured to monitor an environment;
a detection unit configured to detect a change in a state of the environment monitored by the monitoring unit;
a recognition unit configured to recognize the state of the environment; and
a control unit configured to start up said recognition unit and select a recognition database, which is used by said recognition unit, based upon result of detection by said detection unit.

12. The apparatus according to claim 11, wherein said monitoring unit includes a sound collecting unit configured to collect sound in the environment.

13. The apparatus according to claim 11, wherein said monitoring unit includes a shooting unit configured to shoot video in the environment.

14. The apparatus according to claim 11, wherein said monitoring unit includes a sensor configured to measure the state of the environment.

15. A method of controlling an information processing apparatus, comprising:
monitoring an environment;
detecting a change in a state of the monitored environment;
selecting a recognition database and starting up recognition based upon the detected change in the state of the environment; and
recognizing, in response to start-up of recognition, the state of the environment using the selected recognition database.

16. A computer program stored on a non-transitory storage medium for causing a computer to function as the information processing apparatus set forth in claim 11.

* * * * *